US012381021B2

(12) United States Patent
Moore et al.

(10) Patent No.: US 12,381,021 B2
(45) **Date of Patent: *Aug. 5, 2025**

(54) SYSTEM AND METHOD OF PRINTING INDICIA ONTO ARMORED CABLE

(71) Applicant: Southwire Company, LLC, Carrollton, GA (US)

(72) Inventors: John Moore, Newnan, GA (US); Roy O. Jackson, Carrollton, GA (US); David B. McCardel, Marietta, GA (US); James Phillip Tuggle, Carrollton, GA (US)

(73) Assignee: Southwire Company, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/310,584

(22) Filed: May 2, 2023

(65) Prior Publication Data

US 2023/0274860 A1 Aug. 31, 2023

Related U.S. Application Data

(60) Division of application No. 14/467,937, filed on Aug. 25, 2014, now Pat. No. 11,031,157, and a (Continued)

(51) Int. Cl.

*H01B 13/34* (2006.01)
*B41M 5/00* (2006.01)

(Continued)

(52) U.S. Cl.

CPC ......... *H01B 13/345* (2013.01); *B41M 5/0047* (2013.01); *H01B 7/17* (2013.01); *H01B 7/365* (2013.01)

(58) Field of Classification Search

None

See application file for complete search history.

(56) References Cited

U.S. PATENT DOCUMENTS

| | | | |
|---|---|---|---|
| 951,147 | A | 3/1910 | Porter |
| 1,798,486 | A | 3/1931 | Murphy |

(Continued)

FOREIGN PATENT DOCUMENTS

| | | | |
|---|---|---|---|
| CA | 1101951 | A1 | 5/1981 |
| CH | 590544 | | 8/1977 |

(Continued)

OTHER PUBLICATIONS

Parraman, C. "Methods for Multi-Layer Color Printing and Decorative Inks for Ultra-Violet Fine Art Inkjet". J. Imaging Sci. Technol. 57(4): 040503-1-040503-13, 2013. (Year: 2013).*

(Continued)

*Primary Examiner* — Alexander M Weddle
(74) *Attorney, Agent, or Firm* — Merchant & Gould P.C.

(57) ABSTRACT

A method according to the teachings of the present disclosure may include disposing a sheath around a conductor assembly, with an outer surface of the sheath defining spaced apart crowns and valleys. An outlet of at least one ink jet print head may be positioned adjacent the sheath at an angle of 60 degrees to 120 degrees with respect to a longitudinal axis of the sheath. The method may also include using at least one ink jet print head to print marking indicia on the sheath, the marking indicia indicating at least characteristic of the electrical cable assembly.

14 Claims, 4 Drawing Sheets

Related U.S. Application Data continuation of application No. 17/339,558, filed on Jun. 4, 2021, now Pat. No. 11,670,438, which is a division of application No. 14/467,937, filed on Aug. 25, 2014, now Pat. No. 11,031,157.

(60) Provisional application No. 61/869,572, filed on Aug. 23, 2013.

(51) Int. Cl.
*H01B 7/17* (2006.01)
*H01B 7/36* (2006.01)

(56) References Cited

U.S. PATENT DOCUMENTS

| | | | | |
|---|---|---|---|---|
| 2,070,679 | A | 2/1937 | Pebock et al. | |
| 2,106,048 | A | 1/1938 | Candy, Jr. | |
| 2,372,868 | A | 4/1945 | Warren, Jr. | |
| 2,530,655 | A | 11/1950 | Entwistle | |
| 2,591,794 | A | 4/1952 | Ebel | |
| 2,628,998 | A | 2/1953 | Frisbie | |
| 2,865,323 | A | 12/1958 | Hoff | |
| 2,989,943 | A | 6/1961 | Fitzgerald | |
| 3,020,335 | A | 2/1962 | Gillis | |
| 3,197,554 | A | 7/1965 | Baker | |
| 3,212,207 | A | 10/1965 | Searing | |
| 3,229,623 | A | 1/1966 | Rubinstein et al. | |
| 3,328,514 | A | 6/1967 | Cogelia | |
| 3,352,285 | A | 11/1967 | Buhmann | |
| 3,434,456 | A | 3/1969 | Geating | |
| 3,459,878 | A | 8/1969 | Gressitt et al. | |
| 3,474,559 | A | 10/1969 | Hunt | |
| 3,551,542 | A | 12/1970 | Perrone | |
| 3,650,862 | A | 3/1972 | Burr | |
| 3,720,747 | A | 3/1973 | Anderson et al. | |
| 3,766,883 | A | 10/1973 | Swaisgood | |
| 3,903,840 | A | 9/1975 | Gemelli | |
| 3,994,090 | A | 11/1976 | Wheeler | |
| 4,021,315 | A | 5/1977 | Yanagida et al. | |
| 4,029,006 | A | 6/1977 | Mercer | |
| 4,128,736 | A | 12/1978 | Nutt et al. | |
| 4,158,746 | A | 6/1979 | Taylor et al. | |
| 4,161,564 | A | 7/1979 | Legbandt | |
| 4,272,689 | A | 6/1981 | Crosby et al. | |
| 4,274,086 | A | 6/1981 | Benckendorff et al. | |
| 4,278,836 | A | 7/1981 | Bingham | |
| 4,367,417 | A | 1/1983 | Casasanta | |
| 4,399,371 | A | 8/1983 | Ziff et al. | |
| 4,415,217 | A | 11/1983 | Clabburn et al. | |
| 4,415,765 | A | 11/1983 | Iwasa et al. | |
| 4,423,306 | A | 12/1983 | Fox | |
| 4,424,627 | A | 1/1984 | Tarbox | |
| 4,425,390 | A | 1/1984 | Changani et al. | |
| 4,465,717 | A | 8/1984 | Crofts et al. | |
| 4,500,796 | A | 2/1985 | Quin | |
| 4,503,437 | A | 3/1985 | Katzschner | |
| 4,528,420 | A | 7/1985 | Kish et al. | |
| 4,543,448 | A | 9/1985 | Deurloo et al. | |
| 4,543,716 | A | 10/1985 | Damiano et al. | |
| 4,563,050 | A | 1/1986 | Greenwood et al. | |
| 4,579,759 | A | 4/1986 | Breuers et al. | |
| 4,618,203 | A | 10/1986 | Greenwood et al. | |
| 4,627,684 | A | 12/1986 | D'Amato | |
| 4,629,285 | A | 12/1986 | Carter et al. | |
| 4,636,017 | A | 1/1987 | Boteler | |
| 4,636,271 | A | 1/1987 | Gandolfo | |
| 4,637,743 | A | 1/1987 | Kerner et al. | |
| 4,717,357 | A | 1/1988 | Greenwood | |
| 4,775,802 | A | 10/1988 | Dods | |
| RE32,819 | E | 1/1989 | Waugh | |
| 4,868,023 | A | 9/1989 | Ryan et al. | |
| 4,880,484 | A | 11/1989 | Obermeier et al. | |
| 4,947,568 | A | 8/1990 | De Barbieri | |
| 4,997,994 | A | 3/1991 | Andrews et al. | |
| 5,038,001 | A | 8/1991 | Koegel et al. | |
| 5,049,721 | A | 9/1991 | Parnas et al. | |
| 5,110,638 | A | 5/1992 | Vogdes et al. | |
| 5,237,917 | A | 8/1993 | Traut et al. | |
| 5,281,764 | A | 1/1994 | King et al. | |
| 5,285,723 | A | 2/1994 | Ichikawa et al. | |
| 5,289,767 | A | 3/1994 | Montalto et al. | |
| 5,350,885 | A * | 9/1994 | Falciglia | H02G 3/0462 174/109 |
| 5,377,292 | A | 12/1994 | Bartling et al. | |
| 5,444,466 | A | 8/1995 | Smyczek et al. | |
| 5,449,302 | A | 9/1995 | Yarbrough et al. | |
| 5,470,253 | A | 11/1995 | Siems et al. | |
| 5,504,540 | A | 4/1996 | Shatas | |
| 5,557,071 | A | 9/1996 | Falciglia et al. | |
| 5,561,900 | A | 10/1996 | Hosler, Sr. | |
| 5,703,983 | A | 12/1997 | Beasley, Jr. | |
| 5,719,353 | A | 2/1998 | Carlson et al. | |
| 5,739,472 | A | 4/1998 | Buck et al. | |
| 5,777,271 | A | 7/1998 | Carlson et al. | |
| 5,862,774 | A | 1/1999 | Moss | |
| 5,887,368 | A | 3/1999 | Rupp | |
| 5,904,037 | A | 5/1999 | Grulick et al. | |
| 5,982,967 | A | 11/1999 | Mathis et al. | |
| 6,113,996 | A | 9/2000 | Amon et al. | |
| 6,207,902 | B1 | 3/2001 | Balaguer | |
| 6,277,456 | B1 | 8/2001 | Bulgrin et al. | |
| 6,311,637 | B1 | 11/2001 | Moss | |
| 6,358,083 | B1 | 3/2002 | Kraft | |
| 6,370,304 | B1 | 4/2002 | Mills et al. | |
| 6,371,585 | B2 | 4/2002 | Kurachi | |
| 6,404,972 | B1 | 6/2002 | Pasch et al. | |
| 6,562,454 | B2 | 5/2003 | Takahashi et al. | |
| 6,727,433 | B2 | 4/2004 | Tsai | |
| 6,817,895 | B2 | 11/2004 | Kiely | |
| 6,825,418 | B1 * | 11/2004 | Dollins | H01B 7/361 174/112 |
| 6,906,264 | B1 | 6/2005 | Grant, Jr. et al. | |
| 6,918,788 | B2 | 7/2005 | Cavanaugh | |
| 7,465,878 | B2 | 12/2008 | Dollins et al. | |
| 11,670,438 | B2 * | 6/2023 | Moore | B41M 5/0088 427/466 |
| 2001/0042635 | A1 | 11/2001 | Kondo et al. | |
| 2004/0098889 | A1 | 5/2004 | Proctor | |
| 2009/0001707 | A1 | 1/2009 | Brooks | |
| 2009/0095398 | A1 | 4/2009 | Hardin et al. | |
| 2009/0242232 | A1 | 10/2009 | Holcombe et al. | |
| 2011/0220386 | A1 | 9/2011 | Temblador et al. | |
| 2015/0125637 | A1 * | 5/2015 | Bacon | H01B 13/342 138/104 |

FOREIGN PATENT DOCUMENTS

| | | | |
|---|---|---|---|
| DE | 1902057 | | 10/1970 |
| DE | 4016445 | | 8/1991 |
| DE | 29921017 | U1 | 4/2000 |
| EP | 0829884 | A1 | 3/1998 |
| FR | 2686185 | A1 | 7/1993 |
| GB | 194419 | | 3/1923 |
| GB | 260837 | A | 11/1926 |
| GB | 332303 | | 7/1930 |
| GB | 826273 | A | 12/1959 |
| GB | 913514 | | 12/1962 |
| GB | 1117862 | | 6/1968 |
| GB | 1173401 | A | 12/1969 |
| GB | 1432548 | | 4/1976 |
| GB | 2154785 | | 9/1985 |
| JP | 49-020780 | | 2/1974 |
| JP | 50-046970 | | 4/1975 |
| JP | 52-121679 | | 10/1977 |
| JP | 54142587 | A | 11/1979 |
| JP | 55-120031 | | 9/1980 |
| JP | 56-027667 | | 2/1981 |
| JP | 57-143379 | | 9/1982 |
| JP | 57198510 | | 12/1982 |
| JP | 58203336 | | 10/1983 |
| JP | 59087194 | | 5/1984 |
| JP | 60-097179 | | 5/1985 |

(56) References Cited

FOREIGN PATENT DOCUMENTS

| | | | |
|---|---|---|---|
| JP | 62-037186 | | 2/1987 |
| JP | 62202417 | A | 9/1987 |
| JP | 64-081113 | | 3/1989 |
| JP | 1-134808 | | 5/1989 |
| JP | 3-25806 | | 2/1991 |
| JP | 3-067411 | | 3/1991 |
| JP | 03-173015 | | 7/1991 |
| JP | 04-163048 | | 6/1992 |
| JP | 04-312850 | | 11/1992 |
| JP | 7249321 | A | 9/1995 |
| JP | 10144149 | A | 5/1998 |
| JP | 11167821 | A | 6/1999 |
| JP | 2001292513 | A | 10/2001 |
| NL | 6510231 | | 2/1966 |

OTHER PUBLICATIONS

Parraman, C. "The development of artists' novel colour palettes for inkjet printing". SPIE-IS&T. vol. 7528. pp. 75280B-1-75280B-12, 2010. (Year: 2010).*

UL 1569, Underwriters Laboratories Inc., Standard for Safety, Metal-Clad Cables, Second Edition, published Sep. 10, 1998 (161 pages).

CommScope Fiber Optic Cable Products Catalog (70 pages), Date Unknown.

CommScope Spec Sheet for Single Jacket Single Armor Outdoor Cable, 2-288 Fiber Arid-Core(R) Construction, Stranded Loose Tube with 12-fiber Subunits, dated Feb. 14, 2006 (1 page).

UL4; Underwriters Laboratories, Inc., Armored Cable, ISBN 1-55989-986-7, 14th Ed., Jan. 30, 1996, Rev. Feb. 14, 2001.

Kaf-Tech™, Introduction to Color Track ID System Cables, 24 pages, Sep. 2006.

AFC Cable Systems, AFC Field Report: Green HCF-90® Cable, 2 pages, Date Unknown.

AFC Cable Systems, AFC Field Report: Red Fire Alarm/Control Cable™, 2 pages, Date Unknown.

Wiremold/Legrand®, ED339R1,5-Wire Chan-L-Wire® System Product Specifications, 2 pages, 2008.

The Wiremold Company™, 40766, Chan-L-Wire® Pro Series System Installation Instructions, 4 pages, 1996.

* cited by examiner

SYSTEM AND METHOD OF PRINTING INDICIA ONTO ARMORED CABLE

RELATED APPLICATIONS

This application is a continuation of U.S. patent application Ser. No. 17/339,558, filed Jun. 4, 2021, entitled "SYSTEM AND METHOD OF PRINTING INDICIA ONTO ARMORED CABLE", which is a divisional application of U.S. patent application Ser. No. 14/467,937, filed Aug. 25, 2014, entitled "SYSTEM AND METHOD OF PRINTING INDICIA ONTO ARMORED CABLE", now U.S. Pat. No. 11,031,157, which claims the benefit of U.S. provisional patent application No. 61/869,572, filed Aug. 23, 2013, entitled "SYSTEM AND METHOD OF PRINTING INDICIA ONTO ARMORED CABLE", the disclosure of each aforesaid application is hereby incorporated herein by reference in its entirety.

BACKGROUND

In the art of manufacturing electrical cable and similar, elongated, somewhat continuous tubular goods it may be desirable or even necessary to apply certain indicia on the exterior of a cable body or armor covering, with the indicia providing information regarding the specifications of the cable, such as wire size and voltage rating, as well as other information which may be useful to users of the cable.

For example, in the manufacture of armored electrical cable, it is desirable to place information on the exterior of the armor sheath or covering and spaced apart at relatively close intervals (such as, for example, two to three feet) indicating the wire size or gauge, the type of the armored electrical cable, the materials from which conductors of the armored electrical cable are constructed, and the color of conductors of the armored electrical cable, as well as sequential markings indicating a length of the armored electrical cable.

However, the exterior surface of the armored electrical cable may be irregular. Such an irregular exterior surface increases the difficulty of marking armored electrical cable. Therefore, new methods of marking indicia on armored electrical cables are desirable.

BRIEF DESCRIPTION OF THE DRAWINGS

FIG. 4 is a wiring schematic of a kitchen illustrating how the marking indicia on the metal clad armored cable of the present disclosure can be used to indicate which circuit of a schematic the metal clad armored cable is intended to be used in.

SUMMARY

Figure 1:
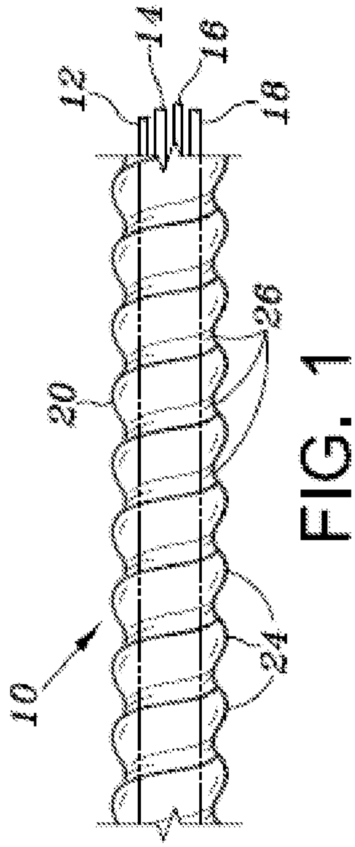
FIG. 1 is a side elevation of a section of metal clad armored electrical cable.

This summary is provided to introduce a selection of concepts that are further described below in the detailed description. This summary is not intended to identify key or essential features of the claimed subject matter, nor is it intended to be used as an aid in limiting the scope of the claimed subject matter.

A method of making an electrical cable assembly is described herein. The method may include disposing a sheath around a conductor assembly, with an outer surface of the sheath defining spaced apart crowns and valleys. An outlet of at least one ink jet print head maybe positioned adjacent the sheath at an angle of 60 degrees to 120 degrees with respect to a longitudinal axis of the sheath. The at least one ink jet print head may be used to print marking indicia on the sheath, the marking indicia indicating at least one characteristic of the electrical cable assembly. The conductor assembly may be formed to have spaced apart crowns and valleys, and disposing the sheath around the conductor assembly may include forming the sheath around the conductor assembly.

The outlet of the at least one ink jet print head may be positioned adjacent the sheath at an angle of 90 degrees with respect to the longitudinal axis of the sheath.

In some applications, the outlet of the at least one ink jet print head may also positioned to be spaced apart from the crowns by a distance of 0.125 inches to 1 inch.

The outlet of the at least one ink jet print head may be positioned to be spaced apart from the crowns by a distance of 0.5 inches.

Between 0.075 ml/ft to 0.7 ml/ft of oil may be applied to the sheath prior to using the at least one ink jet print head to print the marking indicia on the sheath.

Using the at least one ink jet print head to print the marking indicia may include using a plurality of ink jet print heads offset to each other to print the marking indicia. In some cases, using the at least one ink jet print head to print the marking indicia may include using at least one background ink jet print head to print a background section on the sheath, and using at least one information ink jet print head to print at least one informative section on the background section.

The background section may be printed to have a coloration contrasting with a coloration of the at least one informative section. In addition, the background section may be printed to have a coloration that is lighter than a coloration of the at least one informative section. Further, the background section may be printed to be rectangular in shape.

Using the at least one background ink jet print head to print a background section on the sheath may include using a plurality of background ink jet print heads offset to each other to print the background section on the sheath, and using a plurality of information ink jet print heads offset to each other to print at least one informative section on the background section. The background section and the at least one informative section may be printed on at least one of the crowns and the valleys.

The marking indicia may be printed as a plurality of informative sections having spaces therebetween, with at least some of the plurality of informative sections including a plurality of symbols having spaces therebetween smaller than the spaces between the plurality of sections.

The marking indicia may also be printed to include at least one stripe disposed between at least some of the plurality of informative sections. The stripe may be printed to indicate a characteristic of the electrical cable assembly.

In some applications, the marking indicia may be printed to cover at most one half of a circumference of the sheath.

In other applications, the marking indicia may be printed to cover at least one half of a circumference of the sheath.

The marking indicia may be printed from conductive ink. In addition, the marking indicia may be printed as at least one alphanumeric character.

The marking indicia may be printed along a longitudinal length of the sheath parallel to a longitudinal axis of the conductor assembly. In addition, the marking indicia may be printed on at least one of the crowns and the valleys.

The characteristics of the electrical cable assembly may include at least one of a conductor wire gauge, an intended voltage for a conductor wire, a length of a portion of the electrical cable assembly, whether the electrical cable assembly is metal-clad, and a direction to pull the electrical cable assembly during installation. In addition, the characteristics of the electrical cable assembly may include at least one of a number of non-grounded conductors, a gauge of non-grounded conductors, whether the electrical cable assembly is metal-clad and has an internal grounding wire in contact with the armor, whether the electrical cable assembly assembly includes oversized neutral conductors, a number of neutral conductors, construction materials of the electrical cable assembly, and at least one color of conductors of the electrical cable assembly.

The marking indicia may include at least one colored stripe, with the color of the at least one stripe indicating the at least one characteristic of the electrical cable assembly. The color of the at least one colored stripe may match a color of a circuit of a schematic drawing such that the at least one characteristic of the electrical cable assembly indicated by the at least one colored stripe includes the electrical cable assembly being intended to be utilized in the circuit of the schematic drawing.

Also described herein is a method of forming marking indicia on an electrical cable assembly that may be made of a conductor assembly having spaced apart crowns and valleys with a sheath around the conductor assembly. The method may include using at least one ink jet print head to print at least one alphanumeric character on an outer surface of the sheath, with the at least one alphanumeric character indicating at least characteristic of the electrical cable assembly.

An additional electrical cable assembly may be made by disposing an additional sheath around an additional conductor assembly, with an outer surface of the additional sheath defining spaced apart crowns and valleys. An outlet of at least one additional ink jet print head may be positioned adjacent the additional sheath at an angle of 60 degrees to 120 degrees with respect to a longitudinal axis of the additional sheath. At least one additional ink jet print head may be used to print marking indicia on the additional sheath, with the marking indicia indicating at least one characteristic of the additional electrical cable assembly. The marking indicia of the electrical cable assembly may include a first colored stripe, with the color of the first colored stripe matching a color of a first circuit of a schematic drawing, such that the at least one characteristic of the electrical cable assembly indicated by the first colored stripe includes the electrical cable assembly being intended to be utilized in the first circuit of the schematic drawing. The marking indicia of the additional electrical cable assembly may include a second colored stripe, with the color of the second colored stripe matching a color of a second circuit of the schematic drawing, such that the at least one characteristic of the additional electrical cable assembly indicated by the second colored stripe includes the additional electrical cable assembly being intended to be utilized in the second circuit of the schematic drawing.

Another aspect is directed to a method of making an electrical cable assembly. The method may include disposing a sheath around a conductor assembly, with an outer surface of the sheath defining spaced apart crowns and valleys. An outlet of a first ink jet print head may be positioned adjacent the sheath at an angle between 0 degrees to 60 degrees with respect to a longitudinal axis of the sheath. An outlet of a second ink jet print head may be positioned adjacent the sheath at an angle between 120 degrees and 180 degrees with respect to a longitudinal axis of the sheath. The first ink jet print head may be used to print an upper portion of marking indicia on the sheath. The second ink jet print head may be used to print a lower portion of marking indicia on the sheath. The marking indicia may indicate at least one characteristic of the electrical cable assembly.

Also described herein is an electrical cable assembly. The electrical cable assembly may include a conductor assembly, with a sheath disposed around the conductor assembly. The sheath may have an outer surface defining spaced apart crowns and valleys. There may be marking indicia on the sheath to indicate at least one characteristic of the electrical cable assembly. The marking indicia may include at least one colored stripe, with the color of the at least one colored stripe indicating the at least one characteristic of the electrical cable assembly.

The color of the at least one colored stripe may match a color of a circuit of a schematic drawing such that the at least one characteristic of the electrical cable assembly indicated by the at least one colored stripe includes the electrical cable assembly being intended to be utilized in the circuit of the schematic drawing.

DETAILED DESCRIPTION

In the description which follows, like parts are marked throughout the specification and drawings with the same reference numerals, respectively. The drawing figures may not be to scale and certain features may be shown in generalized or schematic form in the interest of clarity and conciseness.

Referring to FIG. 1, there is illustrated a section of metal clad armored electrical cable 10. The cable section 10 is an assembly including plural, elongated flexible electrical conductors 12, 14, 16 and 18, around which is wrapped a continuous strip of metal cladding 20 formed in helical interlocking convolutions thereby providing spaced apart peaks or crowns 24 and valleys 26 disposed between adjacent crowns 24. This metal cladding may be steel, aluminum, or another suitable material. Crowns 24 and valleys 26 may actually be continuous helical convolutions formed by the strip wrapping process. Although the flexible electrical conductors 12, 14, 16, and 18 are shown, it should be understood that the cable section 10 may include any number of such conductors. In addition, it should be understood that there may be multiple ground conductors, and/or multiple non-ground conductors, and/or neutral conductors. In some applications, the ground conductors, and/or the non-ground conductors, and/or the neutral conductors may be oversized, that is, be larger in diameter or gauge than at least one other conductor of the cable section 10.

According to some embodiments, a binder (not illustrated) is wrapped around the conductors and a bare grounding conductor is disposed outside of the binder and in contact with an inner surface of the metal cladding 20 to thereby form a low impedance ground path with the cladding or outer sheath 20. For example, in one embodiment, a binder is wrapped around two insulated and the bare grounding conductor is cabled externally to the binder and conductor assembly.

The metal clad armored cable 10 is exemplary and those skilled in the art will recognize that continuously formed tubular goods, such as other types of armored or insulated electrical cable and tubular goods, such as hose or the like, may also be printed with indicia according to the teachings of the present disclosure.

Figure 2:
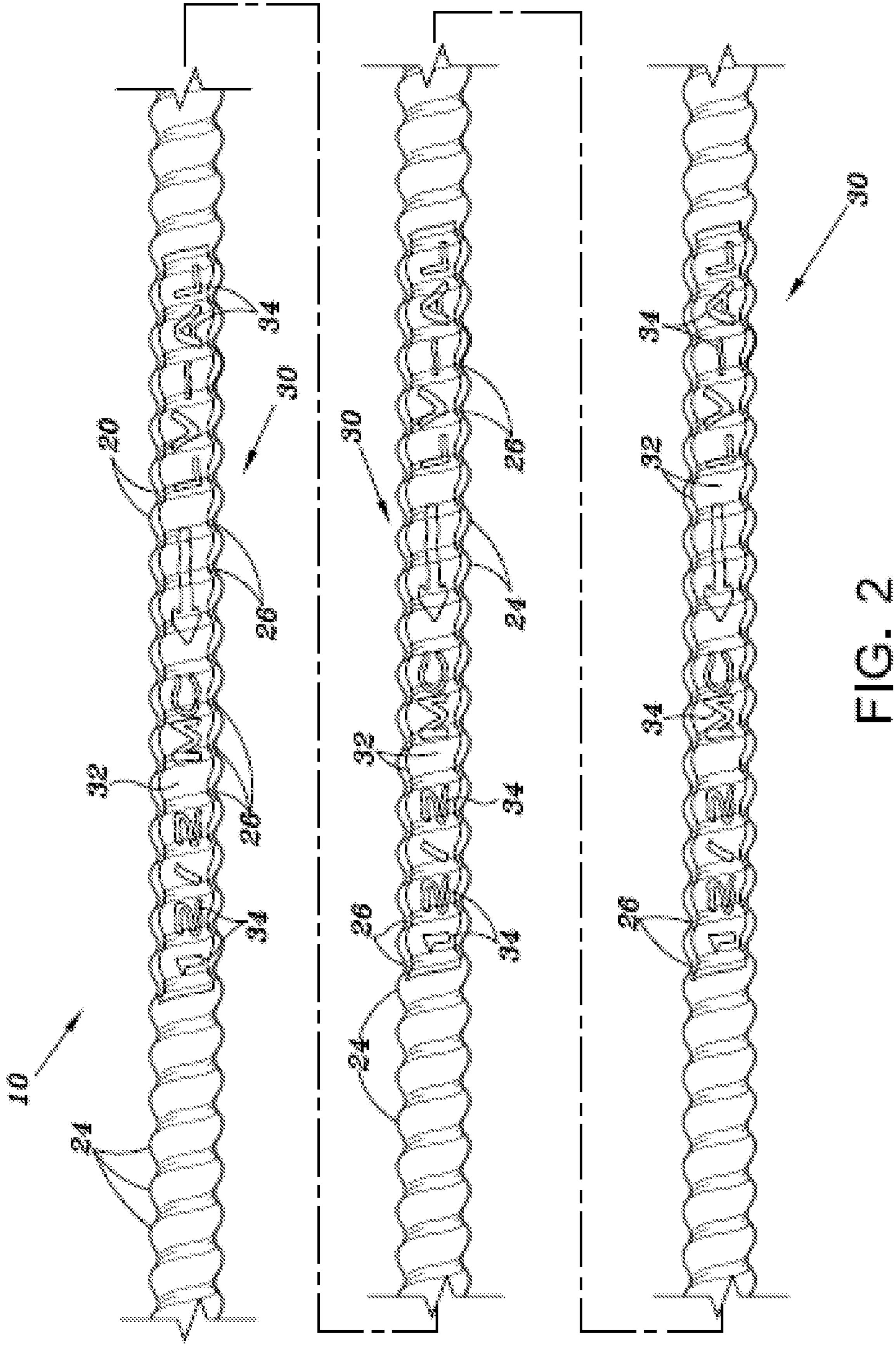
FIG. 2 is a side elevation view of metal clad armored cable with spaced-apart printed sections according to an embodiment of the present disclosure.

As shown in FIG. 2, the metal clad armored cable 10 includes a plurality of spaced-apart printed sections 30. The printed sections 30 are illustrated as covering less than half the circumference of the cable. However, it should be understood that in certain embodiments the printed sections 30 may cover more than half the circumference of the cable.

Figure 3:
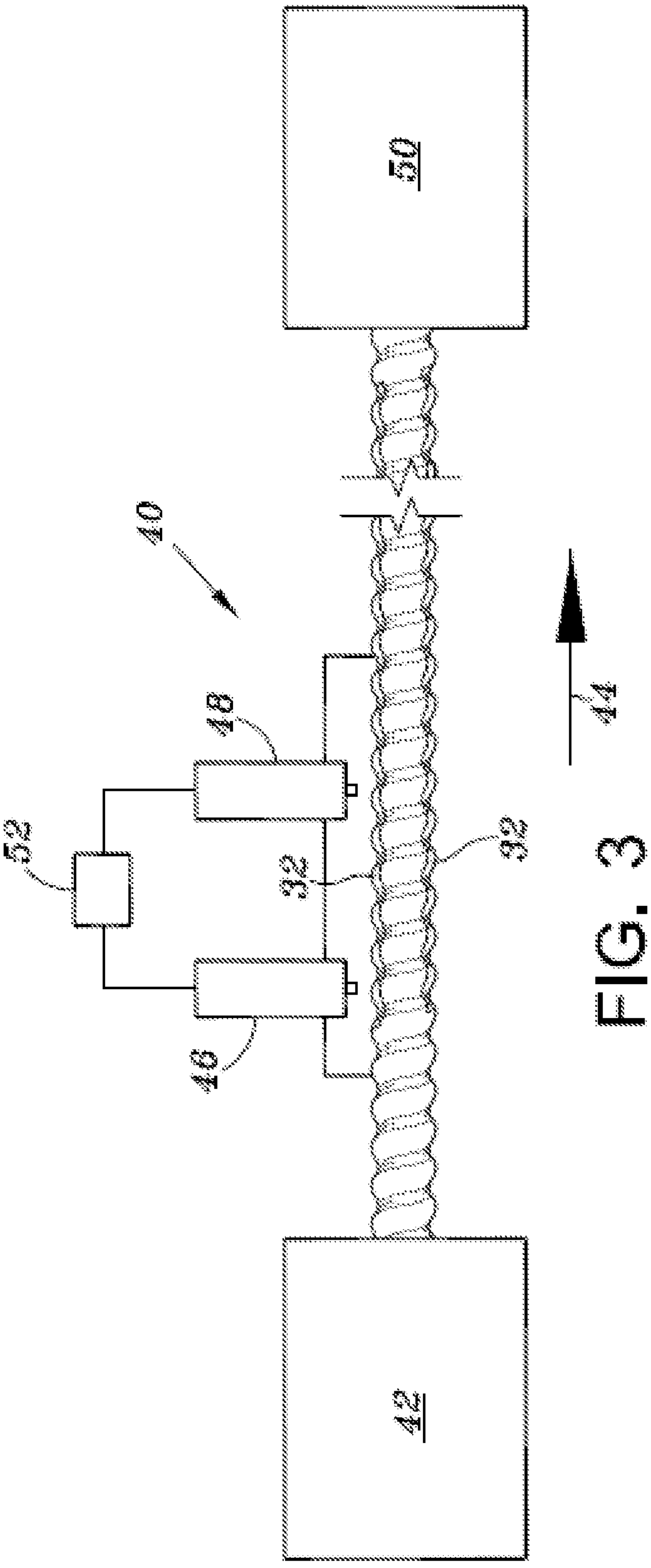
FIG. 3 is a schematic diagram of a printing system operable to apply printed indicia to an armored cable according to an embodiment of the present disclosure.

As shown in FIG. 2, the marking indicia is printed as a plurality of informative sections (i.e. "12/2", "MC", "LC-AL", having spaces therebetween. The informative sections here are alphanumeric characters and symbols. The spaces between the alphanumeric characters and symbols are smaller than the spaces between the informative sections. There is a stripe disposed between some of the informative sections. Details of the marking indicia, informative sections, and stripe will be discussed below. The printed sections 30 are formed of ink applied to the outermost portion or sheath of the formed armored cable 10 with a plurality of print heads 46, 48, as shown in FIG. 3, although it should be understood that there may be any number of print heads. In one embodiment, the ink is applied and otherwise printed along a longitudinal length of the cable and parallel to a longitudinal axis of the cable 10. The ink may be conductive ink so as not to interfere with the conductivity of the armored cable 10. The printed sections 30 may be disposed at certain predefined intervals along the length of the armored cable 10. In addition, the printed sections 30 may be disposed at any portion of the circumference of the cable 10. For example, in smaller diameter circumference cable, the printed section 30 may cover more, for example over half, of the circumference of the cable. In contrast, in larger diameter cables 10, the printed section 30 may cover less than half of the circumference of the cable 10. The printed section 30 is generally disposed on one "side" of the cable, although in some applications it may be disposed on two "sides" of the cable, which allows the printed section 30 to be viewed and read by an individual looking at either side of an outstretched cable or looking at a section of coiled cable 10.

The printed section 30 may optionally include a base ink block 32 and printed indicia 34. The printed indicia 34 is legible even though it is printed on the convolutions of the cable 10. The base ink block 32 may be a generally rectangular section of ink and may wrap partially around the circumference of the cable 30, particularly in smaller diameter cable 10. The base ink block 32 may be light in color to create a contrast that allows the darker colored printed indicia 34 to be easily read. The base ink block 32 may provide a better contrast with the printed indicia 34 than if the printed indicia 34 were printed directly onto the metal cladding 20, which has a generally silver color, which is the natural color of the metal, usually aluminum or steel, but may also be another metal. The base ink block 32 may be printed on the crowns 24 and the valleys 26 and on the metal cladding disposed between the crowns 24 and the valleys 26, which generally forms a sloping side portion of the crowns 24.

The printed indicia 34 may include alphanumeric characters or text along with other indicia. The other indicia may be a symbol. For example, the printed indicia 34 may include an arrow indicating a preferred direction to pull the cable when it is being installed. The alphanumeric characters or other indicia may indicate, but are not limited to indicating, a conductor wire size or gauge, a specified voltage, a predetermined length of cable 10, a number of non-grounded conductors in the cable, a gauge of non-ground conductors in the cable, whether the cable is metal-clad and has an internal grounding wire in contact with the armor, a manufacturer of the cable, whether the cable includes oversized neutral conductors, a number of neutral conductors in the cable, construction materials of the cable, and at least one color of conductors of the cable. In addition, the alphanumeric characters or other indicia may also indicate the intended use of the cable, for example, for general use, for health care facility use, for fire alarm use, etc. Moreover, the printed indicia 34 may take a variety of colors, and the color may indicate a characteristic of the cable 10, such a color of at least one of the conductors, an intended use of the cable, or a voltage expected to be conducted by the cable. It should be appreciated that the alphanumeric characters or other indicia need not indicate electrical or intended use characteristics of the cable, but may instead represent information about the manufacture of the cable itself, such as its location of manufacture, the manufacturer of the cable, the location of the origin of the cable, the location of the destination of the cable, the product name or product line of the cable, the price of the cable, etc. Indeed, the alphanumeric characters or indicia may represent any desired information.

The printed indicia 34 is printed onto the base ink block 32 to create a contrast that allows the printed indicia to be easily read. As such, the printed indicia 34 may be printed using ink that is darker than the ink used for the base ink block 32. The printed indicia 34 may be printed on the crowns 24 and the valleys 26 and on the metal cladding disposed between the crowns 24 and the valleys 26, which generally forms a sloping side portion of the crowns 24.

In addition, a stripe may also be printed along the length of the cable 10 between the printed sections 30. In certain embodiments, the stripe may be printed by the same printer head and in the same color as the printed indicia 34. Similar to the base ink block 32 and the printed indicia 34, the stripe may be printed on the crowns 24 and the valleys 26 and on the metal cladding disposed between the crowns 24 and the valleys 26, which generally forms a sloping side portion of the crowns 24. In some applications, rather than being along the length of the cable, the stripe may be printed about an axis of cable such that it forms an open or closed shape about the axis.

The stripe may serve as an identifying characteristic of a cable having particular specifications or characteristics, or the color of the stripe itself may serve as the identifying characteristic. For example, the color of the stripe may match a color of a given circuit of a schematic drawing having multiple circuits, each with a different color, such that the characteristic of the electrical cable assembly indicated by the stripe is the fact that the electrical cable assembly is intended to be utilized in the given circuit of the schematic drawing.

As will be appreciated by those of skill in the art, the methods herein can be used to form multiple electrical cable assemblies. For example, the methods may be used to form an electrical cable assembly and an additional electrical cable assembly, with the first electrical cable assembly having a first colored stripe on its sheath, and with the second electrical cable assembly having a second colored stripe on its sheath. The first colored stripe may match a first circuit of an engineering drawing, such that the characteristic of the electrical cable assembly indicated by the first colored stripe is the fact that the electrical cable assembly is intended to be used utilized in the first circuit of the engineering drawing. The second colored stripe may match a second circuit of an engineering drawing, such that the characteristic of the additional electrical cable assembly indicated by the second colored stripe is the fact that the additional electrical cable assembly is intended to be used utilized in the second circuit of the engineering drawing.

Figure 4:
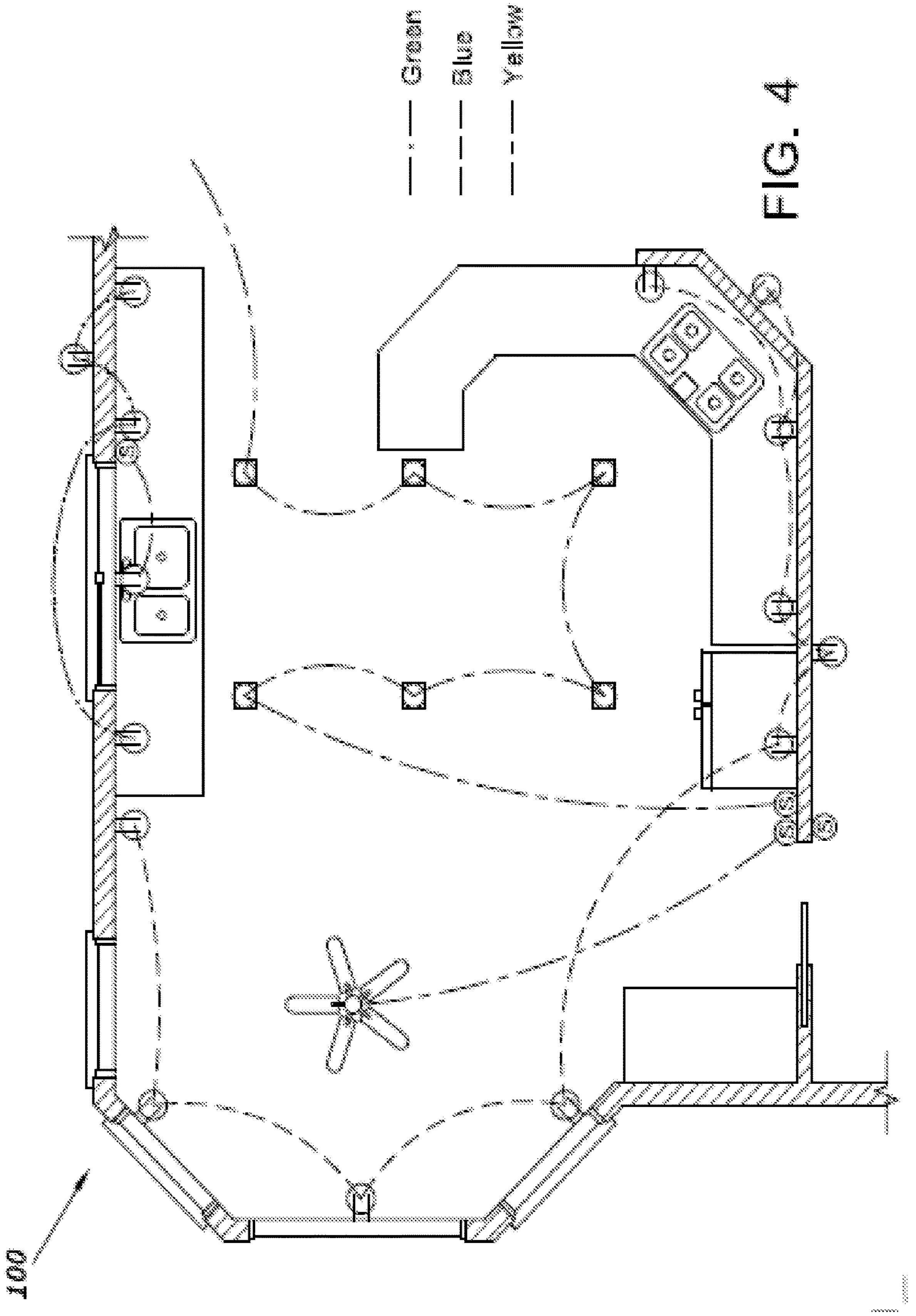

An example of the above is now described with reference to FIG. 4. FIG. 4 is an electrical wiring plan 100 for a kitchen that has three circuits. The first circuit is represented in green (shown as a series of dashes, with two dots between adjacent dashes), the second circuit is represented in blue (shown as a series of equal length dashes), and the third circuit is represented in yellow (shown as a series of alternating long and short dashes). The methods described herein may be used to form first, second, and third electrical cable assemblies. The first electrical assembly has a green stripe thereon to indicate it is to be used in the first circuit, the second electrical cable assembly has a blue stripe thereon to indicate that it is to be used in the second circuit, and the third electrical cable assembly has a yellow stripe thereon to indicate that it is to be used in the third circuit.

Referring now to FIG. 3, there is schematically illustrated a system 40 for printing indicia onto the armored cable 10 at predetermined spaced apart intervals. Preferably, the printing ink is applied to the cable 10 as it is being manufactured in a continuous process which includes an armoring station 42 at which plural conductors 12, 14, 16, 18, the metal cladding or sheath strip 20, and possibly an inner insulating sheath are brought together and the sheath strip 20 is wrapped over the conductors and the insulating sheath to form the metal-clad cable assembly or armored cable 10. As shown in FIG. 3, the armored cable 10 proceeds in the direction of the arrow 44 in a continuous process whereby the cable is pulled by a motor driven capstan from the armoring station 42, is guided by guide rollers and is introduced into the printing system 40. The cable 10 generally moves continuously at a velocity of about, for example, 25 to 30 feet per minute.

The armored cable 10 may have oil applied thereto at the armoring station 42. The amount of oil applied is enough such that the production of the armored cable occurs reliably and consistently, but not too much to cause the armored cable 10 to be "oily" to the touch, to cause the ink to not adhere properly to the armored cable, or to cause the easy transfer of oil from the armored cable to other surfaces, such as sheetrock at a job site.

To that end, components of the armoring station 42 are misted with oil, at a rate of oil application of 2-12 mL/min when the armored cable 10 is moving at a rate of 25-30 ft per minute. The oil transfers to the armored cable 10 via contact between the armored cable and the components of the armoring station 42, at a rate of 0.075 ml/ft to 0.7 ml/ft.

The printing system 40 may include a plurality of print heads generally disposed 180 degrees from each other with respect to the cable 10. Thus, a base ink print head 46 and a indicia print head 48 may disposed on one side of the cable, and a base print head 46 and a indicia print head 48 are disposed on an opposite side of the cable 10, although it should be understood that in some applications, there may be but one base print head 46 and one indicia print head 48, each on the same side of the cable. Each of the print heads may be part of the same industrial ink jet printer, or each print head may be incorporated into a separate industrial ink jet printer. In addition, two of the print heads may be incorporated into one ink jet printer, and the other two (if present) print heads may be incorporated into a separate ink jet printer.

The print heads 46, 48 may be disposed any suitable distance from the armored cable 10. The closer the print heads are disposed from the armored cable 10, the smaller the indicia that is printed on the armored cable, while the farther away the print heads are disposed from the armored cable, the larger the indicia that is printed on the armored cable. If the print heads 46, 48 are disposed at too great of a distance from the armored cable 10, the indicia may be unreadable, however. A suitable range of distances for the print heads 46, 48 to be from the armored cable 10 has been found to be 0.125 inches to 1 inch, with a distance of approximately 0.5 inches producing preferable results.

The indicia print heads 48 may be disposed any suitable distance along the length of the cable 10 from the base ink print heads 46. According to one embodiment, the indicia print heads 48 are disposed approximately four inches along the length of the cable 10 away from the base ink print head 46.

The print heads 46, 48 have outlets from which the ink is sprayed, and the print heads may be positioned such that the outlets are perpendicular to a longitudinal axis of the armored cable 10, or such that the outlets are at an angle of 60 to 120 degrees with respect to the longitudinal axis of the armored cable. While the print heads 46, 48 being positioned perpendicularly to the longitudinal axis of the armored cable 10 has been found to produce preferable results as it results in ink being evenly applied to portions of the armored cable both above and below the longitudinal axis of the armored cable, the print heads being positioned not less than 60 degrees, and not more than 120 degrees, with respect to the longitudinal axis of the armored cable, has also found to produce acceptable result. Angles less than 60 degrees or more than 120 degrees have been found to not produce acceptable results, as those angles may result in a portion of the ink sprayed from the print heads 46, 48 missing the armored cable 10. These distances are measured from the crowns of the armored cable 10.

As the armored cable 10 moves in the direction of motion 44, a section of the cable 10 that receives the printed indicia according to the teachings of the present disclosure first encounters the base ink print heads 46. The base print heads 46 may be offset from each other as shown in FIG. 3 or they may be aligned with each other such that they apply ink to the same length or section of the cable 10. Preferably, the base print heads 46 apply the base ink block 32, possibly of light colored ink, to a predetermined length of cable 10.

According to certain embodiments, the print heads 46, 48 may be angled either toward or away from the armoring station 42 to allow ink from the print heads 46, 48 to be applied to the portion of the cable 10 between the crowns 24 and the valleys 26. Thus, ink is applied to substantially the entirety of the surface of the convolutions of the armored cable 10.

The section of the cable 10 with the base ink block 32 next encounters the indicia print head 48, where the ink forming the indicia 34 is applied over the base ink block 32. Similar to the base ink print heads 32, the indicia print heads 34 may be offset from each other as shown in FIG. 3 or they may be aligned with each other such that they apply ink to the same length of cable 10.

The printer heads 46, 48 receive a signal from a footage encoder 52 indicating the print heads 46, 48 to activate and apply ink to the continuously moving cable 10. In one embodiment, the encoder 52 causes the print heads 46, and 48 to activate in connection with a predetermined length of cable 10 having been measured by the encoder. The signal from the encoder 52 communicated to the base ink print head 46 causes the base ink print head 46 to apply base ink to the cable or to cease applying the base ink to the cable. The signal communicated to the indicia print head 48 indicates whether the indicia print head 48 is to apply the stripe 36 or the printed indicia 34, or is to cease applying ink to the cable 10. According to an alternate embodiment of the present disclosure, the function of the footage encoder 52 in signaling activation of the print heads 46, 48, may be replaced by a timer.

Finally, the cable 10 with spaced apart printed sections 30 thereon, as described above, is wound onto a take-up reel or accumulator 50.

Operation of the cable fabrication system, including the printing system 40, may be carried out using a suitable control system, including an electrical controller or microcontroller adapted to receive a speed and/or position signal from a transducer associated with the capstan or otherwise adapted to determine the position of a particular point on the cable 10 as it traverses from the capstan to the take up reel or accumulator 50. The microcontroller is also operably connected to suitable circuitry, not shown, for providing actuation of the print heads 46, 48. The microcontroller is preferably connected to a source of electrical power, not shown, via suitable conductors and is also operable to be controlled by a user of the system 40 via a user interface. Accordingly, in timed relationship to the movement of the cable 10 between the capstan and the take-up reel 50, the microcontroller may, at a suitable instance, cause actuation of the print heads 46, 48 to apply a base ink block 32 and printed indicia 34 on the base ink block 32 to provide information about the characteristics of the cable 10 using symbols and alphanumeric characters as coded information indicating a characteristic or an intended application of the armored cable 10 according to embodiments of the present disclosure.

Figure 5:
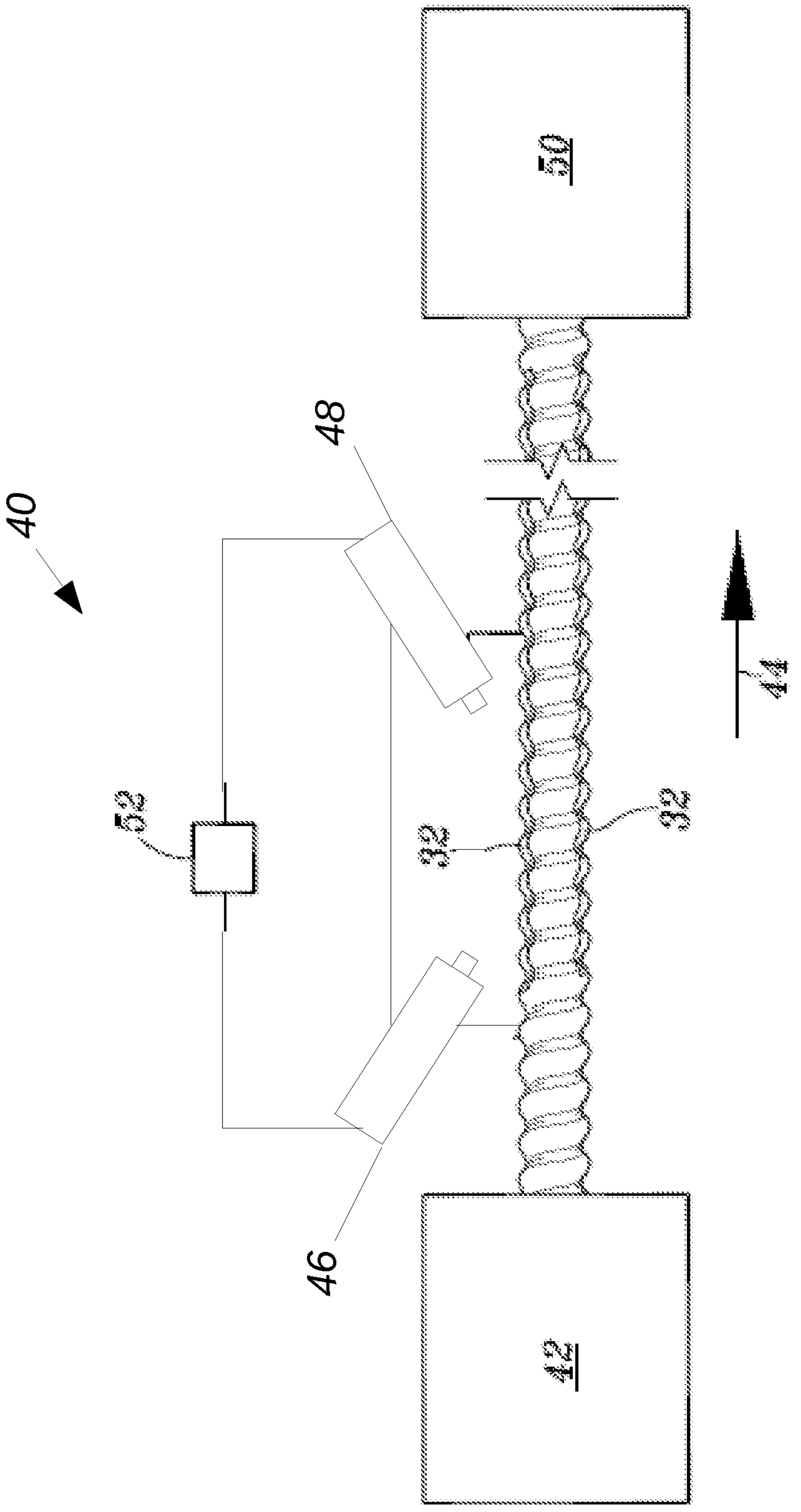
FIG. 5 is a cross sectional diagram of an alternate ink jet print head configuration that may be used with embodiments of the present disclosure.

An alternate configuration of print heads is now described with reference to FIG. 5. Here, there are two print heads 46, 48, with each being positioned at an angle of about 30 degrees with respect to the longitudinal axis of the electrical cable assembly 32. Utilizing this setup, one print head 46 is able to print marking indicia on trailing portions of crowns the sheath of the electrical cable assembly 32, while the other print head 48 is able to print marking indicia on leading portion of crowns of the sheath. Indeed, the first print head 46 may be positioned at any angle between 0 and 59 degree with respect to the longitudinal axis of the electrical cable assembly 32, and the second print head 48 may be positioned at any angle between 120 and 180 degrees with respect to the longitudinal axis of the electrical cable assembly.

Although embodiments of a system and method of printing indicia onto armored cable or similar structure have been described in detail, it also believed that one skilled in the art will recognize that various substitutions and modifications may be made without departing from the scope and spirit of the appended claims.

What is claimed is:

1. An electrical cable assembly comprising:

a conductor assembly comprising a plurality of elongated electrical conductors;

a cladding disposed around the conductor assembly, wherein the cladding comprises an outer surface defining spaced apart crowns and valleys;

an oil layer applied to the outer surface;

a base ink block printed over the oil layer, wherein the base ink is printed on the crowns, the valleys, and between the crowns and the valleys of the cladding; and marking indicia printed on the base ink block, the marking indicia indicating at least one characteristic of the electrical cable assembly.

2. The electrical cable assembly of claim 1, wherein the marking indicia comprises a plurality of sections having first spaces therebetween, wherein each of the plurality of sections comprises a plurality of symbols having second spaces therebetween, wherein the second spaces are smaller than the first spaces, and wherein the marking indicia comprises a first portion and a second portion, the second portion being visually positioned opposite the first portion.

3. The electrical cable assembly of claim 2, wherein the marking indicia comprises at least one colored stripe, wherein a color of the at least one colored stripe is configured to indicate the at least one characteristic of the electrical cable assembly.

4. The electrical cable assembly of claim 3, wherein the color of the at least one colored stripe matches a color of a circuit of a schematic drawing such that the at least one characteristic of the electrical cable assembly indicated by the at least one colored stripe comprises the electrical cable assembly being intended to be utilized in the circuit of the schematic drawing.

5. The electrical cable assembly of claim 3, wherein the color of the at least one colored stripe matches a color of a given circuit of a schematic drawing having a plurality of circuits, at least two of the plurality of circuits having a different color, such that the at least one characteristic of the electrical cable assembly indicated by the at least one colored stripe comprises the electrical cable assembly being intended to be utilized in the given circuit of the schematic drawing.

6. The electrical cable assembly of claim 1, wherein the cladding forms a sloping side portion of the crowns.

7. An electrical cable assembly comprising:

a cladding disposed around a conductor assembly, wherein the cladding comprises an outer surface defining spaced apart crowns and valleys;

an oil layer applied to the outer surface;

a base ink block printed over the oil layer, wherein the base ink is printed on the crowns, the valleys, and between the crowns and the valleys of the cladding; and marking indicia printed on the base ink block, the marking indicia indicating at least one characteristic of the electrical cable assembly.

8. The electrical cable assembly of claim 7, wherein the marking indicia comprises a plurality of sections having first spaces therebetween, wherein each of the plurality of sections comprises a plurality of symbols having second spaces therebetween.

9. The electrical cable assembly of claim 8, wherein the second spaces are smaller than the first spaces.

10. The electrical cable assembly of claim 7, wherein the marking indicia comprises a first portion and a second portion, the second portion being visually positioned opposite the first portion.

11. The electrical cable assembly of claim 7, wherein the marking indicia comprises at least one colored stripe, wherein a color of the at least one colored stripe is configured to indicate the at least one characteristic of the electrical cable assembly.

12. The electrical cable assembly of claim 11, wherein the color of the at least one colored stripe matches a color of a circuit of a schematic drawing such that the at least one characteristic of the electrical cable assembly indicated by the at least one colored stripe comprises the electrical cable assembly being intended to be utilized in the circuit of the schematic drawing.

13. The electrical cable assembly of claim 11, wherein the color of the at least one colored stripe matches a color of a given circuit of a schematic drawing having a plurality of circuits, at least two of the plurality of circuits having a different color, such that the at least one characteristic of the electrical cable assembly indicated by the at least one colored stripe comprises the electrical cable assembly being intended to be utilized in the given circuit of the schematic drawing.

14. The electrical cable assembly of claim 7, wherein the cladding forms a sloping side portion of the crowns.

* * * * *